May 20, 1969 H. WEINSTEIN 3,445,687
ADJUSTABLE VARIABLE VOLTAGE RESPONSIVE TWO-TERMINAL SEMICONDUCTOR SWITCH DEVICE
Filed Dec. 15, 1966
FIG. 1
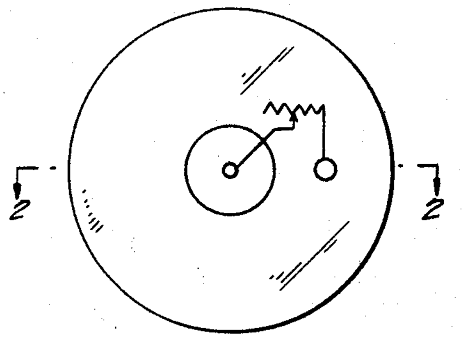
FIG. 3
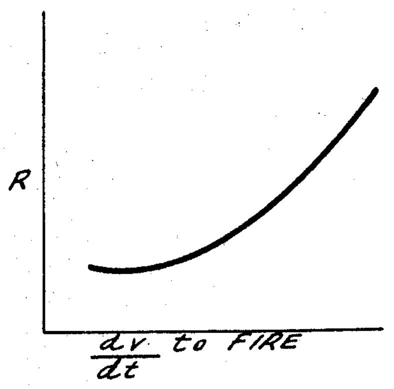
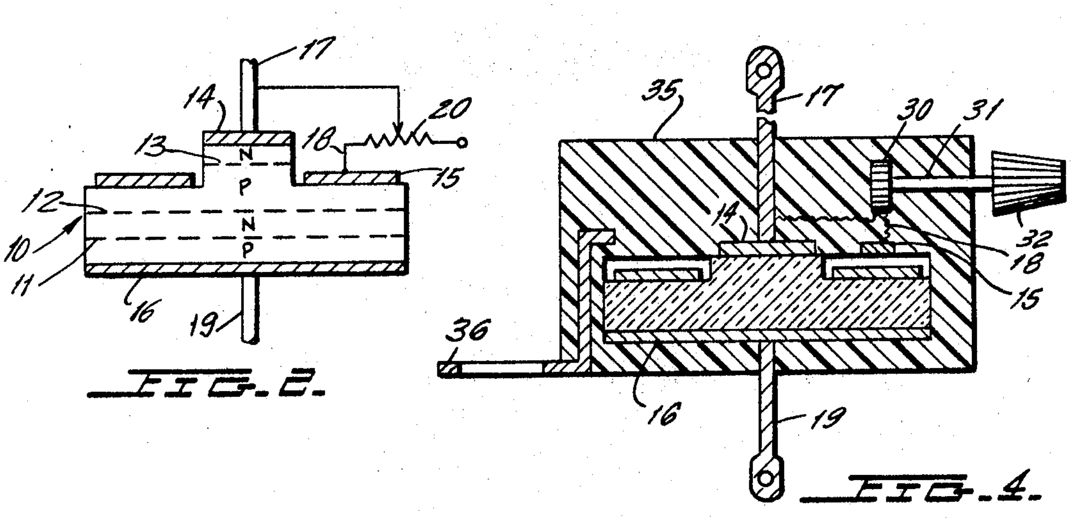
FIG. 2, FIG. 4
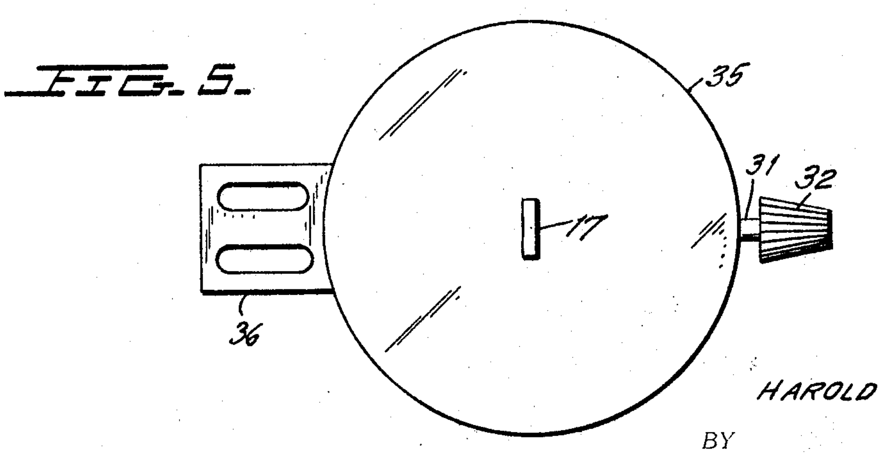
INVENTOR.
HAROLD WEINSTEIN
BY
OSTROLENK, FABER, GERB & SOFFEN
ATTORNEYS 3,445,687

ADJUSTABLE VARIABLE VOLTAGE RESPONSIVE TWO-TERMINAL SEMICONDUCTOR SWITCH DEVICE

Harold Weinstein, Van Nuys, Calif., assignor to International Rectifier Corporation, El Segundo, Calif., a corporation of California Filed Dec. 15, 1966, Ser. No. 602,027
Int. Cl. H03k 3/26
U.S. Cl. 307—305 7 Claims

ABSTRACT OF THE DISCLOSURE

A two-terminal device is formed from a four-layer type controlled rectifier wherein the two available terminals extend from a device housing and are connected to the anode and cathode terminals, respectively, of the controlled rectifier. An adjustable impedance is contained within the housing to adjust the *dV/dt* magnitude which will cause forward conduction of the device and its adjustment means extends through the housing to be externally available. The emitter layer of the device is connected to substantially all of the other conductivity-type layer beneath it through the adjustable impedance to permit control of the *dV/dt* characteristics of the device.

This invention relates to a novel semiconductor device and more specifically relates to a novel two-terminal switching device which is adjustably variable to switch between a nonconducting and conducting condition in accordance with the *dV/dt* of the voltage applied to its two terminals.

There are many circuit applications where it would be desirable to operate a switch in accordance with the rate-of-change of voltage at the terminals of the device. Such a switching application could, for example, be used where it is necessary to protect other electrical equipment from an excessive *dV/dt* or could be used to anticipate the existence of an electrical fault, or the like.

It is well known that controlled rectifiers are sensitive to the rate-of-change of forward blocking voltage between the anode and cathode terminals of the controlled rectifier. Thus, controlled rectifiers are frequently unintentionally fired independently of signals applied to the gate circuit when the *dV/dt* at the anode and cathode terminals increases beyond some predetermined value. In order to overcome this tendency to fire on high *dV/dt*, controlled rectifiers are commonly provided with a shunt formed of an ohmic contact which, in the case of an N-P-N-P device, for example, where the cathode is connected to the N surface, extends across the cathode emitter surface to the P-type layer beneath the cathode emitter surface. Since it is desired to obtain as effective a shunt as possible from as much of the cathode emitter region as possible to the P-type layer beneath it, the cathode emitter N region is commonly broken into numerous isolated islands in the P-type layer, whereby more of the emitter N-type layer can be effectively shunted to the P layer beneath it. Thus, the impedance through the shunt connection will be less than the impedance of any path through the top N layer, whereby triggering under the influence of anode to cathode *dV/dt* is suppressed by the shunt current path. It is well known that when the relative impedance of such a shunt path is decreased, a greater *dV/dt* between anode and cathode terminals is required to fire the controlled rectifier in the absence of a gate signal.

In accordance with the present invention, a controlled rectifier structure is modified by the provision of an adjustable shunt between the gate terminal and cathode terminal with the unit housed so that the device becomes a two-terminal device, making available only the cathode and anode terminals. An adjustment means for adjusting the variable resistor connected between the gate and cathode regions is also made available whereby it becomes possible to adjust the value of *dV/dt* at which the controlled rectifier will fire.

Thus, a novel two-terminal device is provided which can be adjusted to fire only at some predetermined value of *dV/dt* in the circuit connective between the two available terminals.

In accordance with the invention, exemplified in an N-P-N-P device, the N-type region is made small so that its full area can be shunted to a large area of the P-type region below it. The N region and P region below it are then provided with large area ohmic contacts which are connected to one another through an adjustable impedance whereby the current path from most of the N-type layer to most of the P-type layer beneath it has an adjustable impedance with respect to the impedance current paths through the N layer. Therefore, the device will be fired by a *dV/dt* value determined by the impedance of the shunt path as determined by the adjustment of the adjustable impedance.

Accordingly, a primary object of this invention is to provide a novel two-terminal switch which is responsive to variably predetermined *dV/dt*'s.

Yet another object of this invention is to provide a novel circuit device which can be adjusted to fire at any desired value of the *dV/dt* of the electrical energy applied to two terminals of the device within a given range.

These and other objects of this invention will become apparent when taken in connection with the drawings in which:

FIGURE 1 is a top view of a controlled rectifier having an adjustable resistance connected between gate and cathode regions in accordance with the invention.

FIGURE 2 is a cross-sectional view of FIGURE 1 taken across the lines 2—2 in FIGURE 1.

FIGURE 3 illustrates the *dV/dt* characteristic for the anode and cathode terminals of the device of FIGURES 1 and 2 required to fire the device as a function of the shunting resistance between the gate and cathode regions.

FIGURE 4 is a cross-sectional view of an assembled device using the basic controlled rectifier construction of FIGURES 1 and 2 wherein an adjustable resistance and mounting structure are potted within a common housing structure with only two terminals extending from the housing structure.

FIGURE 5 is a top view of FIGURE 4.

Referring now to FIGURES 1 and 2, there is illustrated therein a controlled rectifier structure constructed in accordance with the invention which is comprised of a wafer 10 which may be, for example, of silicon and which has four layers of N, P, N and P-conductivity regions, respectively, which define three junctions 11, 12 and 13. An ohmic cathode electrode 14 is then connected across substantially the full area of the upper N region atop junction 13 and an annular gate electrode 15 is connected across substantially the full area of the P region below the upper N layer. The main anode electrode 16 then extends along the bottom of the device in the usual manner. A cathode lead 17 extends from cathode electrode 14 while gate lead 18 extends from gate electrode 15 and the usual anode electrode 19 extends from anode electrode 16. An adjustable resistor 20 is then connected between leads 17 and 18.

The following terms are defined as follows:

$X_1$ is the impedance of any current path through the wafer within a volume within the wafer bounded on its periphery generally by the outline of upper N region from the junction 12 to the electrode 15;

$X_2$ is the impedance of any current path from the junction 12 to the P region below junction 13 wtihin this same volume;

$\Delta X$ is the incremental difference $X_1 - X_2$ along any current path within the volume;

$X_{RMAX}$ is the maximum resistance of resistor 20;

$X_{RMIN}$ is the minimum resistance of resistor 20.

To obtain the results sought by the invention, good results are obtained when the following relations are obtained:

(1) $\Delta X_{MINIMUM} \geqq .75 X_{RMAX}$;

(2) $X_{RMAX} > \Delta X$;

(3) $X_{RMIN} \ll \Delta X$;

(4) The distance between junctions 12 and 13 is at least 25% greater than the distance from junction 12 to electrode 15.

This latter relation will insure the effectiveness of the majority carrier current path length to the contact shunt, as compared to the path length to the N-emitter region to thereby decrease the impedance of this shorter path.

The *dV/dt* characteristics of the device, that is, the rate-of-rise of voltage in the circuit connected to leads 17 and 19 required to fire the controlled rectifier, will now vary with the value of shunting resistance at adjustable resistor 20 in a manner generally shown in FIGURE 3. Therefore, the device of FIGURES 1 and 2 becomes a novel two-terminal switching device having a variable *dV/dt* characteristic which can be set by the adjustment of adjustable resistor 20.

The device of FIGURES 1 and 2 may now be contained in a housing having only two terminals extending therefrom and an adjustment means extending therefrom to permit adjustment of the adjustable resistor 20. This novel structure is illustrated in FIGURES 4 and 5 where components similar to those of FIGURES 1 and 2 bear identical identifying numerals.

Referring now to FIGURES 4 and 5, it will be seen that the adjustable resistor is comprised of the standard adjustable resistor having a body section 30, a rotatable adjustment shaft 31 and an adjustment knob connected to shaft 31 so that rotation of knob 32 will vary the resistance of resistance section 13. Resistance section 13 is then connected between leads 17 and 18 in the manner shown in FIGURE 2 with the adjustable resistor structure mechanically supported within an insulation potting medium 35 which encapsulates the entire controlled rectifier structure and resistor structure. In addition, a support bracket 36 can also be mechanically secured within the potting medium 35. The device of FIGURES 4 and 5 is now a novel circuit component having only two available terminals 17 and 19 which can be connected into any electrical circuit wherein it is desired to cause a switching action between terminals 17 and 19 responsive to some given value of *dV/dt*. This value can then, of course, be adjusted by adjustment of the adjustable resistor which is also carried in the potting compound 35.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A two-terminal switching device responsive to variable values of changes in voltage per unit of time comprising, in combination, an alternate N-type and P-type conductivity multilayer semiconductor crystalline wafer having an output gate conductor ohmically connected to respective layers thereof; cathode conductor and anode conductor; an adjustable resistor and connection means connecting said adjustable resistor between said gate conductor and cathode conductor; and a common housing means enclosing said wafer and adjustable resistor; said gate conductor and said connection means completely contained within said housing; said cathode conductor and anode conductor each having a terminal extending externally of said housing.

2. The device as set forth in claim 1 wherein said anode conductor and cathode conductor extend externally of said housing defining the sole terminals of said switching device.

3. The device as set forth in claim 1 wherein said adjustable resistor comprises an adjustment mechanism extending externally of said housing.

4. A switching device comprising a controlled rectifier having a crystalline semiconductor wafer of alternate N-type and P-type conductivity multilayers and an output gate conductor ohmically connected to respective layers thereof, cathode conductor and anode conductor; an adjustable resistor having first and second terminals; the outer end of said gate conductor connected to said first terminal of said adjustable resistor and said second terminal of said adjustable resistor connected to an intermediate portion of said cathode conductor for adjustably varying the shunt resistance between said gate and cathode conductors; the outer end of said cathode conductor and the outer end of said anode conductor defining first and second terminals for said switching device whereby said device becomes conductive responsive to different values of voltage applied per unit of time to its said first and second terminals upon different adjusted values of said resistor.

5. The device as set forth in claim 4 which includes a housing for containing said controlled rectifier and adjustable resistance; said outer end of said cathode conductor and said anode conductor extending externally of said housing and said gate conductor completely contained interiorly of said housing.

6. The device as set forth in claim 5 wherein said anode conductor and cathode conductor extend externally of said housing and define the sole terminals of said switching device.

7. The device as set forth in claim 6 wherein said adjustable resistor comprises an adjustment mechanism extending externally of said housing.

References Cited

UNITED STATES PATENTS

| | | | |
|---|---|---|---|
| 3,176,147 | 3/1965 | Miller | 317—235 X |
| 3,275,906 | 9/1966 | Matsukura et al. | 317—234 |
| 3,351,826 | 11/1967 | Hermann | 317—235 |

JAMES D. KALLAM, *Primary Examiner.*

U.S. Cl. X.R.

317—234, 235